United States Patent [19]

Schlottmann et al.

[11] 4,077,506
[45] Mar. 7, 1978

[54] DIVERTER ASSEMBLY

[75] Inventors: Herman Schlottmann, Hamburg, Mich.; John G. Melchior, Toledo, Ohio

[73] Assignee: Temcor, Inc., Brighton, Mich.

[21] Appl. No.: 516,976

[22] Filed: Oct. 22, 1974

[51] Int. Cl.² .......................................... B65G 15/00
[52] U.S. Cl. .................................. 198/367; 198/637
[58] Field of Search ............... 198/185, 31 R, 31 AC, 198/20 R, 29, 38, 42, 24, 37, 31 AA, 78, 79, 81, 188; 74/519, 520; 214/1 BC

[56] References Cited

U.S. PATENT DOCUMENTS

| 1,803,391 | 5/1931 | Jennings et al. | 198/38 |
| 1,945,482 | 1/1934 | Dupuy | 198/38 X |
| 2,298,197 | 10/1942 | Coffey | 74/519 |
| 2,455,741 | 12/1948 | Dodge | 198/31 AC |
| 3,006,457 | 10/1961 | Weiss | 198/188 |
| 3,139,965 | 7/1964 | Eggert | 198/31 AC |
| 3,236,360 | 2/1966 | Winter | 198/367 |
| 3,276,563 | 10/1966 | Fitzgerald et al. | 198/367 |
| 3,625,088 | 12/1971 | Sundermann | 74/520 |
| 3,709,353 | 1/1973 | Sheetz | 198/367 |

FOREIGN PATENT DOCUMENTS 523,599   10/1953   Belgium ............................ 198/185

Primary Examiner—Drayton E. Hoffman
Assistant Examiner—Ross Weaver

[57] ABSTRACT

A solenoid actuated diverter mechanism including a pivoted arm selectively operable to pass or divert articles moving along a conveyor path. Resilient linkage preloaded by solenoid actuation for swinging the arm into a final "over-center" diverting position yields to intercepting engagement of a passing article occurring before the final diverting position is reached. A spring returns the arm from diverting to passing position upon de-energizing the solenoid. Load reaction on the over-center linkage delays return until completion of any diverting engagement which may have started prior to de-energizing the solenoid.

10 Claims, 3 Drawing Figures

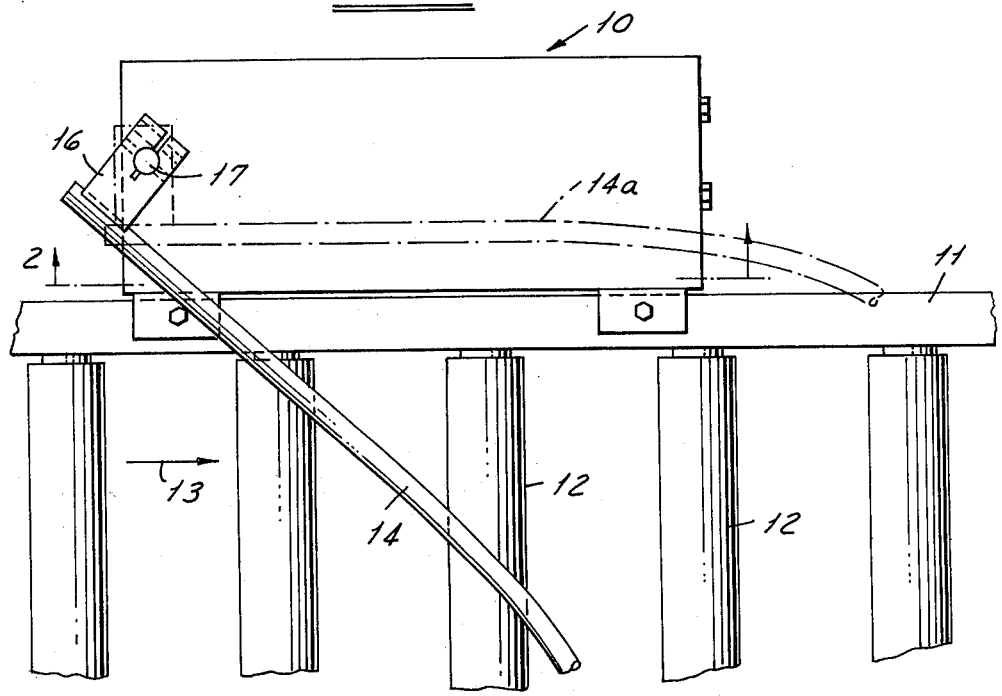
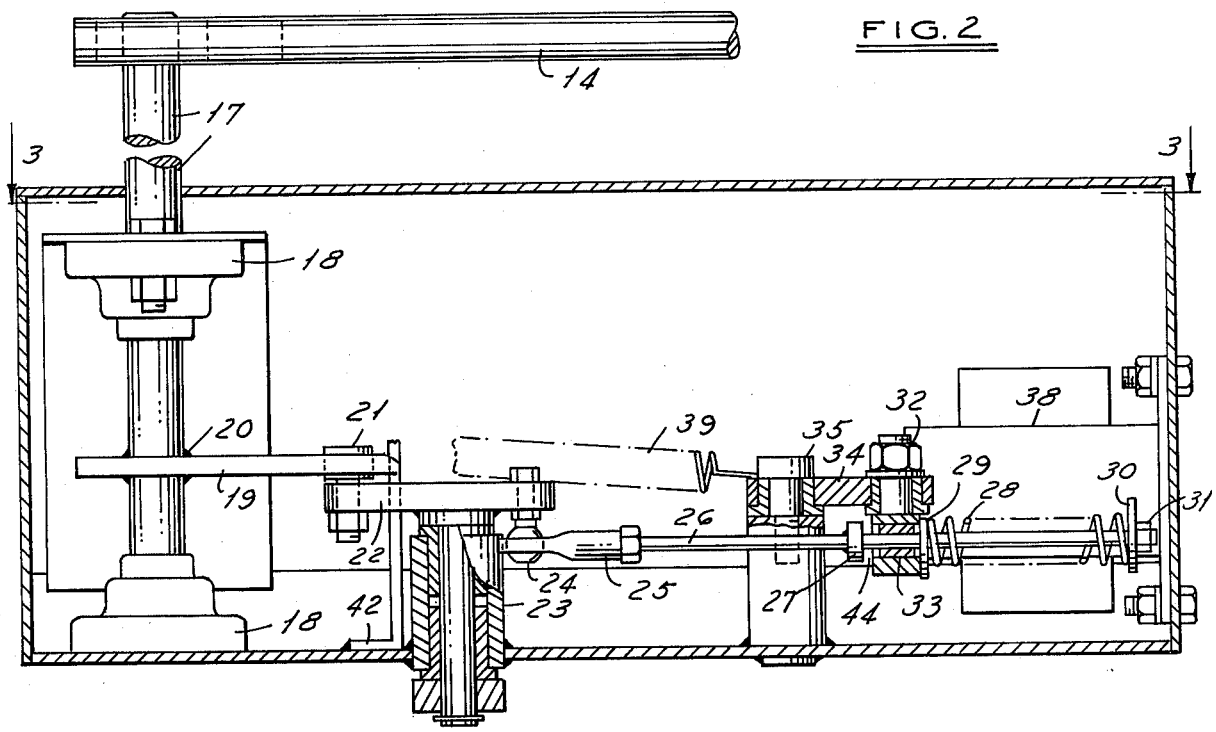

DIVERTER ASSEMBLY

BACKGROUND OF THE INVENTION

In the conveyor art involving selective dispatch to branch lines or multiple delivery points, selectively operable diverter mechanisms are employed which may take the form of curved arms adapted to intercept an article moving along a conveyor and shunt it to a branch line or delivery station utilizing the momentum of the article, gravity and/or conveyor drive to divert the article through reactive biased engagement to an off-line position, or with the diverter arm in a retracted position permit the article to continue on the conveyor past the diverting point. The matter of providing a swinging or otherwise retractable arm with an appropriate bias for accomplishing such diversion is a relatively simple matter of mechanical design and many forms of actuating mechanism for moving such arm between diverting and passing position have been employed. Such mechanisms are relatively simple and dependable in cases where they can be fully positioned before engagement and retracted only after diverting action has been completed. However, difficulties have been encountered providing a dependable mechanism which can cope with the problem of an article on the conveyor having moved part way past the diverting point at the time of diverter actuation; or with the corollary problem of possible retraction of the diverting arm before the diverting action once started has been completed. In many cases an abortive diverting action resulting in a misdelivery may occur where diverter arm movement is started during passage of the article or retracted before diversion is complete. Another problem occurs where an electrical solenoid is employed in providing the motive power for moving a diverter arm where an appreciable amount of time is involved effecting such movement. Since it is characteristic of a solenoid linear actuator that the electric power requirements for effecting a given linear force during the travel period of a solenoid plunger is many times greater than the power requirement for holding the solenoid at the completion of the travel so that any delay in the plunger travel which might arise from the inertia of the diverter arm with positive linkage actuation tends to create an overheating problem leading to malfunctioning of the solenoid; and such problem is greatly amplified by any delay in the completion of the solenoid plunger stroke which might be occasioned by article interference with the travel of the diverter arm.

SUMMARY OF THE INVENTION

The present invention provides an effective fail-safe solution to all of these problems wherein solenoid actuation preloads a resilient linkage for moving the diverter arm and wherein engagement of the diverter arm by an article in any intermediate position between fully retracted and fully extended diverting positions overcomes the spring force operating to move the diverter arm to diverting position so that the article will remain on its original conveyor path rather than incur a misdelivery. On the other hand, once the diverter arm has reached a final diverting position an over-center linkage feature resists reaction pressure on the arm from the diverting action and also employs such reaction pressure to retain the arm in its diverting position notwithstanding de-energizing of the solenoid and the application of a return spring force to the diverter arm adequate to effect its return in the absence of article engagement thereby assuring completion of any article diversion before return movement of the diverter arm can start.

Thus, immediate electrical latching of the solenoid plunger is effected upon energizing the solenoid which in turn applies a relatively light spring force only sufficient to move the diverter arm to its diverting position in the absence of article engagement reaction pressure on the diverter arm and the relatively gradual acceleration and completion of the diverter arm movement incident to the relatively light actuating force in no way interferes with substantially instantaneous travel of the solenoid plunger; and constantly tensioned return spring sufficient to effect return of the diverter arm to its passing position upon de-energizing the solenoid is insufficient to initiate return movement under the application of reaction pressure to the diverter arm and over-center linkage by an article being diverted.

IN THE DRAWINGS

FIG. 1 is a plan view of the diverter mechanism mounted on the side of a roller conveyor;

FIG. 2 is a sectional elevation taken along the line 2—2 of FIG. 1;

DESCRIPTION

Figure 3:
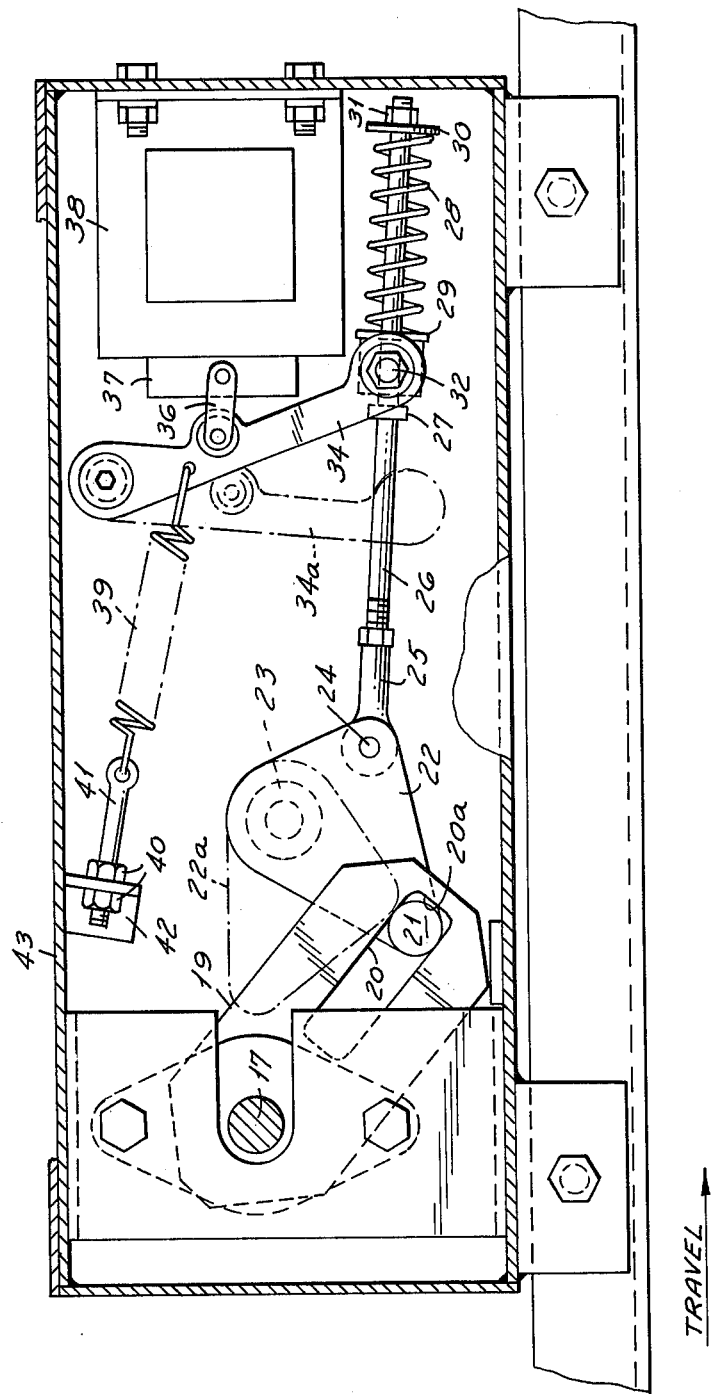
FIG. 3 is a sectional plan view taken along the line 3—3 of FIG. 2.

With reference to FIG. 1, the diverter assembly 10 is mounted on the side rail 11 of a roller conveyor 12 on which articles are transported on rollers 12 by gravity or by roller drive as well known in the art. The articles to be diverted may be any discreet articles moving individually along the path 13 of the conveyor. The particular diverter arm 14 illustrated in the drawings is adapted for diverting engagement in the full line position shown by mail trays under the control of a selective delivery system which diverts trays to branch lines for sorting purposes in a response to the number of trays being processed on the branch line. Thus, the diverter arm may be actuated independently of any mail trays which may be approaching the diverter station and the arm may be actuated from the passing position 14a to its diverting position at any time relative to the passage of a tray along the path 13.

The arm 14 illustrated is a simple cylindrical rod suitably curved at its end 15 to effect desired shunting action. At its inner end the arm is welded to a clamp 16 adjustably positioned on a shaft 17 the rotation of which effects the swinging of the arm between its retracted and diverting positions.

With reference to FIGS. 2 and 3 the shaft 17 is mounted with flange bearings 18 on either side of a cam plate 19 welded at 20 to the shaft 17. As best shown in FIG. 3 the cam plate 19 is provided with a straight roller track 20 engaging a roller cam follower 21 mounted on the end of an operating lever 22 pivotally mounted on a fixed flange bushing 23 and having a spaced pivotal connection 24 with an adjustable rod end 25 connected to a lever rod 26 having a fixed stop 27 welded thereon. A compression spring 28 extends between two slidable washers 29 and 30 the latter being engaged by an adjustable lock nut 31 and the former being engaged by a lever pivot 32 having a bushing 33 slidably engaging the rod 26 whereby a spring lever 34 pivotally mounted at 35 actuated by link 36 connected to plunger 37 of solenoid 38 may upon energizing the solenoid compress the spring 28 against the washer 30 establishing tension on the arm 26 for rotating the operating lever 22 from its retracted position shown by dotted line 22a to the full line position shown in FIG. 3 which corresponds to the diverting position of the arm 14. In this position it will be seen that any reaction force on the arm from load engagement will be directed against the mounting for pivot 23 without exerting any linear force on the rod 26 due to the substantially normal relationship between the engagement surface of the cam track 20 and the line of reaction between the cam follower 21 and pivot 23. The effective stop 20a at the end of the cam track 20 engaged by the cam follower 21 when the compression spring 28 has moved the diverting arm 14 to its final diverting position is designed with an over-center relationship so that a component of the reaction force on the arm 14 will resist clockwise rotation of the operating lever 22 as required for returning the diverting arm 14 to its retracted position 14a.

Such return travel is effected by tension spring 39 connected to spring lever 34 when the solenoid 38 is de-energized causing the lever pivot 32 to engage the fixed stop 27 urging the lever rod 26 to the left as seen in FIG. 3. The tension in spring 39 may be adjusted by lock nuts 40 on the threaded rod 40 passing through angle bracket 42 suitably secured to the housing 43. Since the solenoid 38 must overcome the tension spring 39 as well as to compress spring 28 with sufficient force to actuate the diverter arm 14, the return spring 39 is preferably adjusted to a minimum value compatible with dependable prompt action.

In order to initiate return movement, it is preferred that the linkage be designed to accommodate a slight space 44 between the stop 27 and lever pivot 32 in order to provide a slight impact when the solenoid is de-energized which will assist in starting the return action but will be insufficient to overcome the reaction load of an article against the diverter arm 14 when the operating lever 22 is in an over-center diverting position.

From the above description it will be understood that starting with the passing position 14a the operation of this diverter arm in the absence of an approaching article will take place with the following sequence: Energizing solenoid 38 will immediately pull spring lever 34 from the dotted line position 34a to the full line position shown in FIG. 3 extending the return spring 39 and compressing the spring 28 against the washer 30 thereby tensioning the lever rod 26 which more gradually swings the operating lever 22 and diverting arm 14 to diverting position through travel of the cam follower 21 in the cam track 20 of the lever plate 19. In the final diverting position the cam follower 21 will reach the stop surface 20a of the cam track 20 in an over-center relationship relative to pivot 23 and the spring 28 will have expanded to a no-clearance free length or slightly compressed condition between the washers 29 and 30 with a slight space 44 between the lever pivot 32 and fixed stop 27. Any diverting action thereafter with the arm in final diverting position will create a reaction force against the pivot 23 and tend to hold the operating lever 22 at its counterclockwise extremity of travel due to the over-center relationship of the linkage.

Return of the diverting arm in the absence of a diverting load will take place upon de-energizing the solenoid 38 through the force applied to spring lever 34 by the return spring 39 as well as any residual compression in the spring 28 causing it to contact the fixed stop 27 moving the lever rod 26 and the operating lever 22 causing it to swing in a clockwise direction to the dotted line position 22a returning the diverting arm 14 to the passing position 14a.

In the event the arm 14 is contacted by an approaching article during its travel toward a diverting position, spring 28 will recompress to any extend required to permit the article to pass without diverting displacement after which compression spring will again act to move the diverting arm 14 toward a diverting position. This will prevent misdelivery of an article as might occur if diverting action were started after partial passage of the diverting station. In addition, the fast action of the solenoid in reaching its energized position without delay from any time it takes the diverting arm to reach diverting position either with or without the additional delay of a passing article assures a minimum of high current flow during the period of closing the solenoid plunger so that only the nominal current involved in holding the plunger in its final energized position will prevail after the rapid closing.

In the event the solenoid 38 is de-energized while a diverting reaction load is on the arm 14 the return spring 39 and impact on the fixed stop 27 will be insufficient to move the operating lever 22 from its over-center position so that completion of the diverting action will be assured at which time the release of reaction pressure will permit the return spring 39 to complete the return movement of the diverting arm.

We claim:

1. A diverter mechanism comprising a diverter arm with a mounting for movement between non-diverting and diverting positions, reversible power actuated means for effecting said movement including yieldable linkage for moving said diverter arm to said diverting position and including terminal linkage for resisting reaction pressure against said diverter arm in its final diverting position, said yieldable linkage including a resilient means for actuating said linkage with a predetermined limited force insufficient to cause diverting action during the entire transitional portion of movement of said diverter arm, and said yieldable linkage including means to release said resisting terminal linkage through reversal of said power actuated means.

2. A diverter mechanism as set forth in claim 1 including a solenoid for actuating said yieldable linkage.

3. A diverter mechanism as set forth in claim 1 including a pivoted mounting for said diverter arm, a spaced pivotally mounted operating lever with a drive connection to said diverter arm, said drive connection including interengaging cam and follower means displaced from the respective pivotal axes providing a reversible drive during the transitional portion of diverter arm movement and an irreversible drive at said final diverting position.

4. A diverter mechanism as set forth in claim 3 including a push-pull actuator in said linkage, and said resilient means comprising a spring on said push-pull actuator.

5. A diverter mechanism as set forth in claim 4, and a solenoid adapted to actuate said spring in moving said diverter means to diverting position.

6. A diverter mechanism as set forth in claim 5 including a pivoted arm actuated by said solenoid means, said arm being adapted to compress said spring in a diverter actuating direction.

7. A diverter mechanism as set forth in claim 6 including a return spring connected to said solenoid actuated pivoted arm to reverse its travel upon release of said solenoid.

8. A diverter mechanism as set forth in claim 7 wherein said push-pull actuator has a positive stop engaged by said solenoid actuated pivoted arm in returning said linkage and diverter arm to non-diverting position under the force of said return spring.

9. A diverter mechanism as set forth in claim 8 with lost motion provided between said stop and engaging arm in the final diverting position which provides a slight impact when said solenoid is released assisting initiation of movement of said cam and follower movement to return said diverter means.

10. A diverter mechanism as set forth in claim 7 including over-center means at one extremity of the travel of said cam and follower means adapting reaction pressure on said diverter arm to resist said return spring until any diverting action is completed.

* * * * *